(12) United States Patent
Kubo et al.

(10) Patent No.: US 10,449,590 B2
(45) Date of Patent: Oct. 22, 2019

(54) PRESSED COMPONENT MANUFACTURING METHOD, PRESSED COMPONENT, AND PRESS APPARATUS

(71) Applicant: NIPPON STEEL CORPORATION, Tokyo (JP)

(72) Inventors: Masahiro Kubo, Tokyo (JP); Hiroshi Yoshida, Tokyo (JP); Takashi Miyagi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 53 days.

(21) Appl. No.: 15/567,719

(22) PCT Filed: Apr. 21, 2016

(86) PCT No.: PCT/JP2016/062683
§ 371 (c)(1),
(2) Date: Oct. 19, 2017

(87) PCT Pub. No.: WO2016/171230
PCT Pub. Date: Oct. 27, 2016

(65) Prior Publication Data
US 2018/0104733 A1      Apr. 19, 2018

(30) Foreign Application Priority Data

Apr. 22, 2015    (JP) ................... 2015-087506

(51) Int. Cl.
*B21D 22/26*   (2006.01)
*B21D 53/88*   (2006.01)
(Continued)

(52) U.S. Cl.
CPC ............... *B21D 22/26* (2013.01); *B21D 5/00* (2013.01); *B21D 22/21* (2013.01); *B21D 24/04* (2013.01);
(Continued)

(58) Field of Classification Search
CPC ....................................................... B21D 5/06
See application file for complete search history.

(56) References Cited

U.S. PATENT DOCUMENTS

2013/0239645 A1    9/2013  Tanaka et al.
2015/0273563 A1   10/2015  Miyagi et al.
(Continued)

FOREIGN PATENT DOCUMENTS

JP    2004-314123 A    11/2004
JP    2006-289480 A    10/2006
(Continued)

OTHER PUBLICATIONS

Explanation of Circumstances Related to Accelerated Examination for PCT/JP2016/062683 submitted on Sep. 7, 2016.
(Continued)

*Primary Examiner* — Adam Krupicka
(74) *Attorney, Agent, or Firm* — Birch, Stewart, Kolasch & Birch, LLP

(57) ABSTRACT

A method for manufacturing a pressed component including an elongated top plate, a wall having one end connected to a short direction end portion of the top plate, that curves with a convex shape bowing toward an opposite side to the top plate as viewed from an upper side of the top plate, and that includes a sharp curve portion, and a flange that is connected to another end of the wall, and that extends in a plate thickness direction of the wall toward the opposite side to the top plate side. The manufacturing method includes pressing to form an intermediate formed component including a preliminary flange and pressing to deform the preliminary flange to form the preliminary flange into the flange.

2 Claims, 20 Drawing Sheets

(51) Int. Cl.
    *B21D 5/00*     (2006.01)
    *B21D 24/04*     (2006.01)
    *B21D 22/21*     (2006.01)
    *B62D 25/04*     (2006.01)
    *B21D 22/06*     (2006.01)
    *B62D 25/20*     (2006.01)

(52) U.S. Cl.
    CPC ............. *B21D 53/88* (2013.01); *B62D 25/04* (2013.01); *B21D 22/06* (2013.01); *B62D 25/2009* (2013.01)

(56) References Cited

U.S. PATENT DOCUMENTS

2015/0336619 A1    11/2015   Tanaka et al.
2015/0367397 A1    12/2015   Uchiyama et al.

FOREIGN PATENT DOCUMENTS

| | | |
|---|---|---|
| JP | 2008-221289 A | 9/2008 |
| JP | 2009-241109 A | 10/2009 |
| JP | 2011-195103 A | 10/2011 |
| JP | 5382281 B1 | 1/2014 |
| JP | 2015-131306 A | 7/2015 |
| JP | 5836972 B2 | 12/2015 |
| JP | 6052479 B1 | 12/2016 |
| TW | 201422332 A | 6/2014 |
| TW | 201436897 A | 10/2014 |

OTHER PUBLICATIONS

International Search Report for PCT/JP2016/062683 dated Aug. 2, 2016.
Written Opinion of the International Searching Authority for PCT/JP2016/062683 (PCT/ISA/237) dated Aug. 2, 2016.

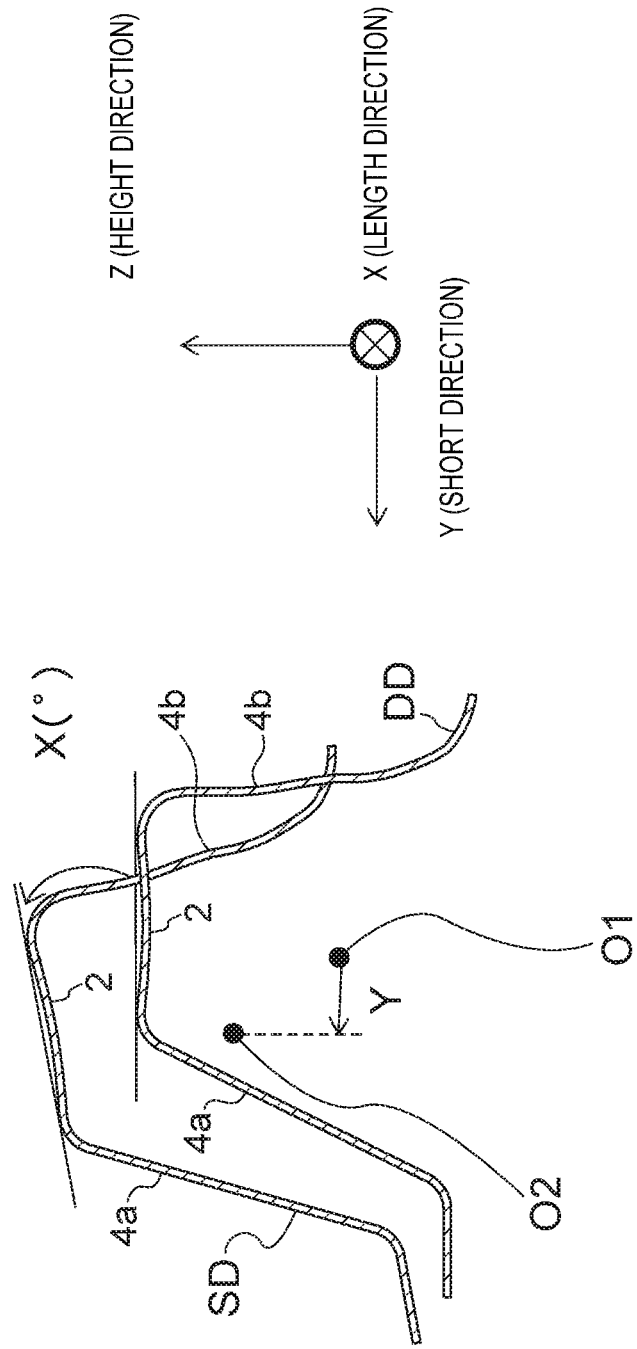

FIG. 9

| EXAMPLE | PLATE-THICKNESS mm | STRENGTH MPa | FIRST PROCESS 4b1(°) | FIRST PROCESS 4b2(°) | FIRST PROCESS 4b3(°) | SECOND PROCESS 4b1(°) | SECOND PROCESS 4b2(°) | SECOND PROCESS 4b3(°) | LEADING END PORTION TWISTING ° | REAR END PORTION TWISTING ° | LEADING END PORTION BENDING mm | REAR END PORTION BENDING mm | AVERAGE BEND AMOUNT mm |
|---|---|---|---|---|---|---|---|---|---|---|---|---|---|
| COMPARATIVE EXAMPLE 1 | 1.2 | 1310 | 160 | 160 | 160 | 150 | 150 | 150 | 21.64 | 17.63 | 6.66 | 9.78 | 8.22 |
| COMPARATIVE EXAMPLE 2 | 1.2 | 590 | 160 | 160 | 160 | 150 | 150 | 150 | 6.01 | 5.34 | 3.97 | 1.81 | 2.89 |
| COMPARATIVE EXAMPLE 3 | 1.0 | 1310 | 160 | 160 | 160 | 150 | 150 | 150 | 23.42 | 20.81 | 13.74 | 5.94 | 9.84 |
| COMPARATIVE EXAMPLE 4 | 1.2 | 1470 | 160 | 160 | 160 | 150 | 150 | 150 | 14.64 | 11.90 | 4.38 | 5.85 | 5.12 |
| EXAMPLE 1 | 1.2 | 1310 | 160 | 160 | 160 | 140 | 140 to 150 | 150 | 16.64 | 14.38 | 9.55 | 3.28 | 6.42 |
| EXAMPLE 2 | 1.2 | 1310 | 160 | 160 to 165 | 165 | 140 | 140 to 150 | 150 | 18.14 | 15.40 | 10.55 | 3.65 | 7.10 |
| EXAMPLE 3 | 1.2 | 1180 | 160 | 160 | 160 | 140 | 140 to 150 | 150 | 13.07 | 11.30 | 7.50 | 2.58 | 5.04 |
| EXAMPLE 4 | 1.2 | 980 | 160 | 160 | 160 | 140 | 140 to 150 | 150 | 9.51 | 8.22 | 5.46 | 1.87 | 3.67 |
| EXAMPLE 5 | 1.2 | 590 | 160 | 160 | 160 | 140 | 140 to 150 | 150 | 5.94 | 5.14 | -3.41 | 1.17 | -1.12 |
| EXAMPLE 6 | 1.0 | 1310 | 160 | 160 | 160 | 140 | 140 to 150 | 150 | 19.97 | 17.26 | 11.46 | 3.94 | 7.70 |
| EXAMPLE 7 | 1.2 | 1470 | 160 | 160 | 160 | 140 | 140 to 150 | 150 | 10.85 | 9.43 | 1.71 | 4.91 | 3.31 |
| EXAMPLE 8 | 1.2 | 1310 | 160 | 160 | 160 | 100 | 100 to 90 | 90 | 7.53 | 8.72 | 1.08 | 7.23 | 4.15 |
| EXAMPLE 9 | 1.2 | 1310 | 160 | 160 | 160 | 130 | 130 to 110 | 110 | 6.43 | 7.07 | 1.51 | 7.39 | 4.45 |
| EXAMPLE 10 | 1.2 | 1310 | 100 | 100 | 100 | 100 | 100 to 90 | 90 | 2.24 | 7.53 | 1.46 | 7.02 | 4.24 |
| EXAMPLE 11 | 1.2 | 1310 | 130 | 130 | 130 | 100 | 100 to 90 | 90 | 3.29 | 7.03 | 0.49 | 8.68 | 4.58 |
| EXAMPLE 12 | 1.2 | 1310 | 130 | 130 | 130 | 130 | 130 to 110 | 110 | 2.03 | 6.28 | 0.94 | 8.72 | 4.83 |

PRESSED COMPONENT MANUFACTURING METHOD, PRESSED COMPONENT, AND PRESS APPARATUS

TECHNICAL FIELD

The present disclosure relates to a manufacturing method for a pressed component, a pressed component, and a press apparatus.

BACKGROUND ART

Automotive bodies are assembled by superimposing edges of multiple formed panels, joining the formed panels together by spot welding to configure a box body, and joining structural members to required locations on the box body by spot welding. Examples of structural members employed at a side section of an automotive body (body side) include side sills joined to the two sides of a floor panel, an A-pillar lower and an A-pillar upper provided standing upward from a front portion of the side sill, a roof rail joined to an upper end portion of the A-pillar upper, and a B-pillar joining the side sill and the roof rail together.

Generally speaking, configuration elements (such as respective outer panels) of structural members including A-pillar lowers, A-pillar uppers, and roof rails often have a substantially hat-shaped lateral cross-section profile configured by a top plate extending in a length direction, two convex ridge line portions respectively connected to the two sides of the top plate, two vertical walls respectively connected to the two convex ridge line portions, two concave ridge line portions respectively connected to the two vertical walls, and two flanges respectively connected to the two concave ridge line portions.

SUMMARY OF INVENTION

Technical Problem

The configuration elements described above have comparatively complex lateral cross-section profiles and are elongated. In order to suppress an increase in manufacturing costs, the above configuration elements are generally manufactured by cold pressing. Moreover, in order to both increase strength and achieve a reduction in vehicle body weight in the interests of improving fuel consumption, thickness reduction of the above structural members through the use of, for example, high tensile sheet steel having a tensile strength of 440 MPa or greater is being promoted.

However, when high tensile sheet steel is cold pressed in an attempt to manufacture configuration elements that curve along their length direction, such as roof rail outer panels (referred to below as "roof members"; roof members are automotive structural members), spring-back occurs during press mold removal, leading to concerns of twisting in the top plate. This gives rise to issues with regard to shape fixability, whereby roof members cannot be formed in a desired shape.

For example, Japanese Patent Application Laid-Open (JP-A) No. 2004-314123 (referred to below as "Patent Document 1") describes an invention in which a pressed component having a uniform hat-shaped lateral cross-section along its length direction is applied with a step during manufacture in order to suppress opening-out, and thus improve the shape fixability.

Moreover, the specification of Japanese Patent No. 5382281 (referred to below as "Patent Document 2") describes an invention in which, during the manufacture of a pressed component that includes a top plate, vertical walls, and flanges, and that curves along its length direction, a flange formed in a first process is bent back in a second process so as to reduce residual stress in the flange, thereby improving the shape fixability.

When the invention described in Patent Document 1 is used to manufacture pressed components shaped so as to curve along a length direction, for example in configuration elements of configuration members such as A-pillar lowers, A-pillar uppers, or roof rails, bending occurs in curved walls as a result of spring-back after removal from the mold, such that the desired shape cannot be formed.

According to the invention described in Patent Document 2, when manufacturing pressed components that curve along their length direction and height direction and that include a bent portion in the vicinity of the length direction center, residual stress arises in the flange, residual stress arises at inner faces of the vertical walls and the top plate, and deviatoric residual stress arises at inner faces of the vertical walls and the top plate. As a result, as viewed from the top plate side, bending occurs as a result of spring-back in the pressed component after removal from the mold, such that the desired shape cannot be formed.

An object of the present disclosure is to provide a manufacturing method for a pressed component in which the occurrence of bending as viewed from a top plate side is suppressed. Note that in the present specification, a "pressed component" includes: an elongated top plate; a wall having one end connected to a short direction end portion of the top plate, that curves with a convex shape bowing toward an opposite side to the top plate as viewed from an upper side of the top plate, and that includes a sharp curve portion having a smaller radius of curvature than at both sides of the sharp curve portion in the top plate length direction; and a flange that is connected to another end of the wall and that extends in a plate thickness direction of the wall toward the opposite side to the top plate side.

Solution to Problem

A pressed component manufacturing method according to the present disclosure is a method for manufacturing a pressed component including an elongated top plate, a wall having one end connected to a short direction end portion of the top plate, that curves with a convex shape bowing toward an opposite side to the top plate as viewed from an upper side of the top plate, and that includes a sharp curve portion having a smaller radius of curvature than at both sides of the sharp curve portion in the top plate length direction, and a flange that is connected to another end of the wall and that extends in a plate thickness direction of the wall toward the opposite side to the top plate side. The manufacturing method includes a first process of pressing to form an intermediate formed component including the top plate, the wall, and a preliminary flange connected to another end of the wall and extending in a plate thickness direction of the wall toward the opposite side to the top plate side. The manufacturing method also includes a second process of pressing to deform the preliminary flange such that an angle of a corner formed between a specific portion of the preliminary flange connected to the sharp curve portion and the sharp curve portion progressively increases or decreases at respective portions from one end to another end along the length direction, so as to form the preliminary flange into the flange.

A pressed component according to the present disclosure includes an elongated top plate, a wall, and a flange. The wall has one end connected to a short direction end portion of the top plate, curves with a convex shape bowing toward an opposite side to the top plate as viewed from an upper side of the top plate, and includes a sharp curve portion having a smaller radius of curvature than at both sides of the sharp curve portion in the top plate length direction. The flange is connected to another end of the wall and extends in a plate thickness direction of the wall toward the opposite side to the top plate side, with an angle of a corner formed between the flange and the sharp curve portion progressively increasing or decreasing from one end to the other end of the flange in the length direction.

Moreover, a pressed component according to the present disclosure is the pressed component described above, wherein a Vickers hardness value of a portion of the flange connected to the sharp curve portion is lower than a Vickers hardness value of a portion of the flange having a high Vickers hardness value out of portions of the flange connected to the wall on one end side and on the other end side of the sharp curve portion in the length direction.

A pressing apparatus according to the present disclosure includes a first press device to press a blank using a first die and a first punch so as to form an intermediate formed component, and a second press device to press the intermediate formed component using a second die and a second punch. In the first press device, an elongated first groove configured including an elongated first groove-bottom face and an elongated first side face is formed in the first die. Moreover, in the first press device, the first side face is configured including a first curved face that has one end connected to a short direction end portion of the first groove-bottom face, that is curved with a convex shape bowing toward an opposite side to the first groove-bottom face side as viewed along a mold closing direction, and that includes a first sharp curve portion having a smaller radius of curvature than at both sides of the first sharp curve portion in the first groove-bottom face length direction. The first side face is further configured including a first inclined face that is connected to another end of the first curved face, that is formed on the opposite side to the first groove-bottom face side as viewed along the mold closing direction, and that is inclined with respect to the first curved face. Furthermore, in the first press device, the shape of the first punch is a shape that fits together with the shape of the first groove during mold closure. In the second press device, an elongated second groove configured including an elongated second groove-bottom face and an elongated second side face is formed in the second die. Moreover, in the second press device, the second side face is configured including a second curved face that has one end connected to a short direction end portion of the second groove-bottom face, that is formed at a position corresponding to the first sharp curve portion, that is curved in a concave shape opening toward an opposite side to the second groove-bottom face side as viewed along the mold closing direction, and that includes a second sharp curve portion having a smaller radius of curvature than at both sides of the second sharp curve portion in the second groove-bottom face length direction. The second side face is further configured including a second inclined face that is connected to another end of the second curved face and that is formed on the opposite side to the second groove-bottom face side as viewed along the mold closing direction, with an angle of a corner formed between the second inclined face and the second sharp curve portion progressively increasing or decreasing from one end to the other end of the second inclined face in the length direction. Furthermore, in the second press device, the shape of the second punch is a shape that fits together with the shape of the second groove during mold closure.

Advantageous Effects of Invention

Employing the pressed component manufacturing method according to the present disclosure enables a pressed component to be manufactured while suppressing the occurrence of bending as viewed from the top plate side.

The pressed component according to the present disclosure has little bending as viewed from the top plate side.

Employing the press apparatus of the present disclosure enables a pressed component to be manufactured while suppressing the occurrence of bending as viewed from the top plate side.

BRIEF DESCRIPTION OF DRAWINGS

FIG. 8 is a diagram to explain evaluation methods for twisting and bending.

FIG. 9 is a table illustrating evaluation results obtained through simulation for twisting and bending in roof members of Examples (Examples 1 to 12) of an exemplary embodiment, and twisting and bending in roof members of Comparative Examples (Comparative Examples 1 to 4).

DESCRIPTION OF EMBODIMENTS

Summary

Figure 1:
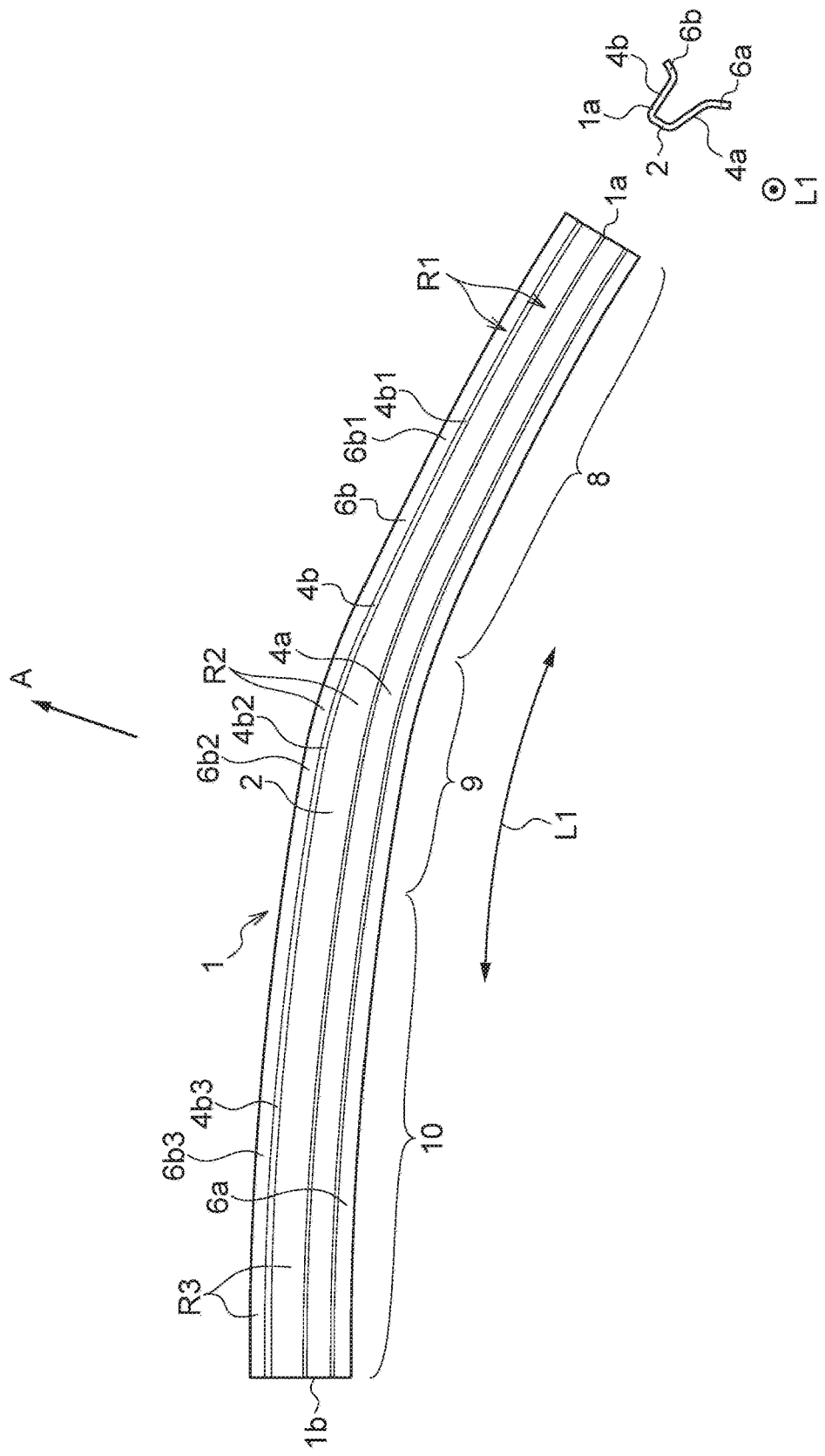
FIG. 1 is a plan view of a roof member and a face-on view of one end portion of the roof member of an exemplary embodiment.

The following explanation relates to an embodiment for implementing the present disclosure, namely, an exemplary embodiment. Explanation follows regarding an Example of the present exemplary embodiment.

Present Exemplary Embodiment

Explanation follows regarding the present exemplary embodiment. First, explanation follows regarding configuration of a roof member 1 of the present exemplary embodiment illustrated in, for example, FIG. 1, FIG. 2A, FIG. 2B, FIG. 2C, FIG. 2D, FIG. 2E, and FIG. 2F. Explanation then follows regarding configuration of a press apparatus 17 of the present exemplary embodiment illustrated in, for example, FIG. 4 to FIG. 7. This will be followed by explanation regarding a manufacturing method of the roof member of the present exemplary embodiment. This will then be followed by explanation regarding advantageous effects of the present exemplary embodiment. Note that the roof member 1 of the present exemplary embodiment corresponds to an Example 1, described later, illustrated in FIG. 9.

Roof Member Configuration

First, explanation follows regarding configuration of the roof member 1 of the present exemplary embodiment, with reference to the drawings. Note that the roof member 1 is an example of a pressed component.

As illustrated in FIG. 1, FIG. 2A, FIG. 2B, FIG. 2C, FIG. 2D, FIG. 2E, and FIG. 2F, the roof member 1 is an elongated member integrally configured including a top plate 2, two vertical walls 4a, 4b, and two flanges 6a, 6b, and having a substantially hat-shaped cross-section profile. The roof member 1 is, for example, configured by a component cold pressed from a high tensile steel stock sheet having 1310 MPa grade tensile strength. Namely, the roof member 1 of the present exemplary embodiment is, for example, configured by a component cold pressed from a high tensile steel stock sheet having a tensile strength of from 440 MPa to 1600 MPa.

As illustrated in FIG. 1, FIG. 2A, FIG. 2B, FIG. 2C, FIG. 2D, FIG. 2E, and FIG. 2F, the top plate 2 is elongated. As illustrated in FIG. 1, as viewed from the upper side of the top plate 2, the top plate 2 is curved along its length direction, namely along the arrow L1 in the drawings.

The two vertical walls 4a, 4b oppose each other in a state respectively extending from both short direction ends of the top plate 2. As illustrated in FIG. 1, as viewed from the upper side of the top plate 2, the two vertical walls 4a, 4b curve along the length direction of the top plate 2. Namely, the two vertical walls 4a, 4b of the present exemplary embodiment oppose each other in a state extending from both short direction ends of the top plate 2, and are curved as viewed from the upper side of the top plate 2. The vertical wall 4a is curved in a concave shape opening toward the opposite side to the vertical wall 4b side, namely the side facing the vertical wall 4b side. The vertical wall 4b is curved in a convex shape bowing toward the opposite side to the vertical wall 4a side, namely the side facing the vertical wall 4a side. From another perspective, one end of the vertical wall 4b is connected to a short direction end portion of the top plate 2, and curves with a convex shape bowing toward the opposite side to the top plate 2 as viewed from the upper side of the top plate 2, namely toward the side indicated by arrow A in the drawings. Note that vertical wall 4b is an example of a wall.

As illustrated in FIG. 1, FIG. 2A, FIG. 2B, FIG. 2C, FIG. 2D, FIG. 2E, and FIG. 2F, the roof member 1 is further integrally configured including a first portion 8 including one end portion 1a, a third portion 10 including another end portion 1b, and a second portion 9 connecting the first portion 8 and the third portion 10 together.

Note that in the present exemplary embodiment, in plan view, namely as viewed from the upper side of the top plate 2, the radius of curvature R1 of the first portion 8 is, for example, set to greater than 2000 mm and no greater than 9000 mm. The radius of curvature R2 of the second portion 9 is, for example, set to from 500 mm to 2000 mm, and the radius of curvature R3 of the third portion 10 is, for example, set to greater than 2000 mm and no greater than 9000 mm. The radius of curvature R1 of the vertical wall 4b at the first portion 8 (referred to below as the portion 4b1) is, for example, set to greater than 2000 mm and no greater than 9000 mm, the radius of curvature R2 of the vertical wall 4b at the second portion 9 (referred to below as the portion 4b2) is, for example, set to from 500 mm to 2000 mm, and the radius of curvature R3 of the vertical wall 4b at the third portion 10 (referred to below as the portion 4b3) is set to greater than 2000 mm and no greater than 9000 mm. Namely, the portion 4b2 has a smaller radius of curvature R than at both sides of the portion 4b2 in the top plate 2 length direction (the portion 4b1 and the portion 4b3). Note that the portion 4b2 is an example of a sharp curve portion.

As illustrated in FIG. 1, FIG. 2A, FIG. 2B, FIG. 2C, FIG. 2D, FIG. 2E, and FIG. 2F, one end of the flange 6a is connected to the end of the vertical wall 4a on the opposite side to the side connected to the top plate 2. Moreover, as viewed from the upper side of the top plate 2, the flange 6a curves in a concave shape opening toward the opposite side to the top plate 2. Note that the flange 6a is connected to the end of the vertical wall 4a on the opposite side to the side connected to the top plate 2 over the entire length direction range. The flange 6a extends in a plate thickness direction of the vertical wall 4a toward the opposite side to the top plate 2. The smaller angle out of the angles formed between the flange 6a and the vertical wall 4a is, for example, set to 120° over the entire length direction range.

As illustrated in FIG. 1, FIG. 2A, FIG. 2B, FIG. 2C, FIG. 2D, FIG. 2E, and FIG. 2F, one end of the flange 6b is connected to the end of the vertical wall 4b on the opposite side to the side connected to the top plate 2. Moreover, as viewed from the upper side of the top plate 2, the flange 6b is curved in a convex shape bowing toward the opposite side to the top plate 2. Moreover, the flange 6b extends in a plate thickness direction of the vertical wall 4b toward the opposite side to the top plate 2. Note that the flange 6a is connected to the end of the vertical wall 4b on the opposite side to the side connected to the top plate 2 over the entire length direction range.

Figure 2A:
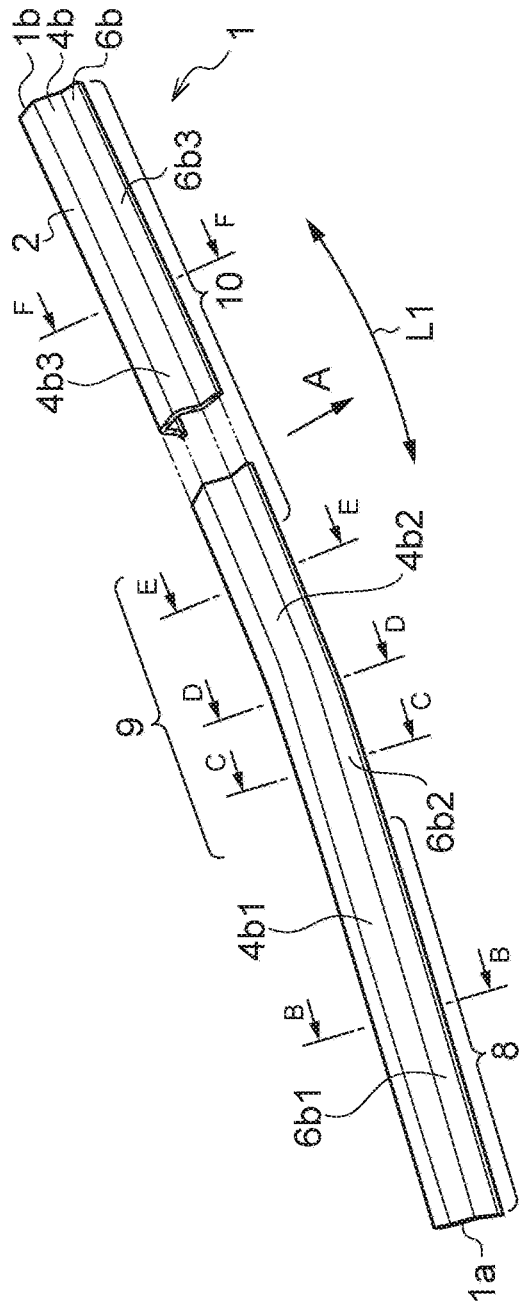
FIG. 2A is a perspective view and partial cross-section of a roof member of an exemplary embodiment.
Figure 2B:
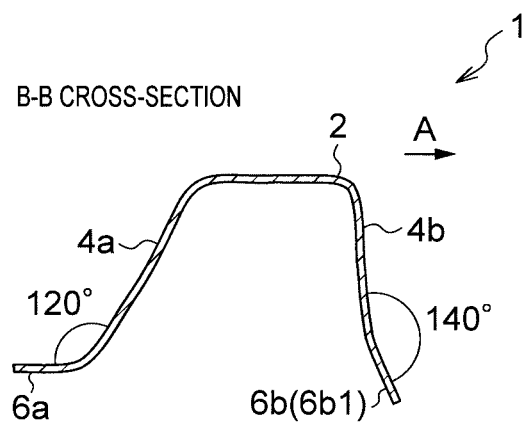
FIG. 2B is a cross-section (B-B cross-section) of a roof member, sectioned along line B-B in FIG. 2A.
Figure 2C:
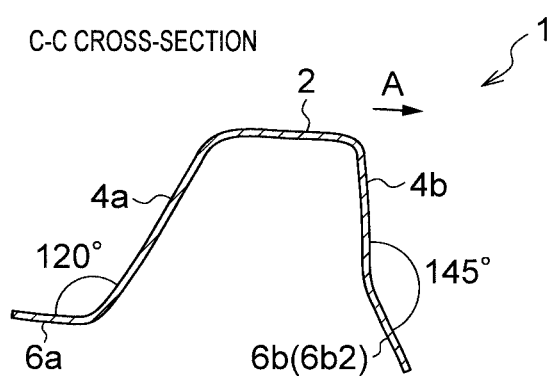
FIG. 2C is a cross-section (C-C cross-section) of a roof member, sectioned along line C-C in FIG. 2A.
Figure 2D:
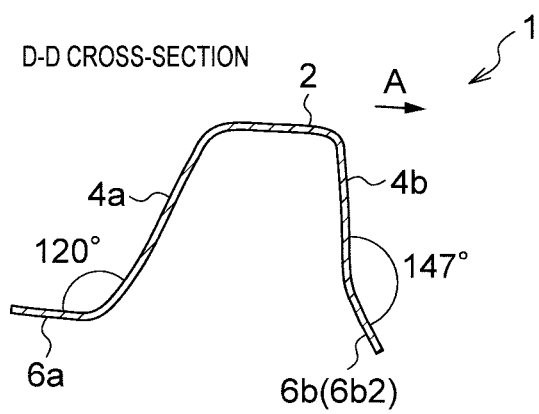
FIG. 2D is a cross-section (D-D cross-section) of a roof member, sectioned along line D-D in FIG. 2A.
Figure 2E:
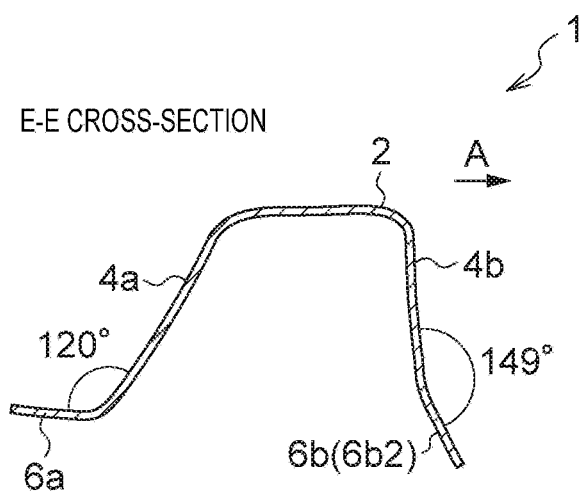
FIG. 2E is a cross-section (E-E cross-section) of a roof member, sectioned along line E-E in FIG. 2A.
Figure 2F:
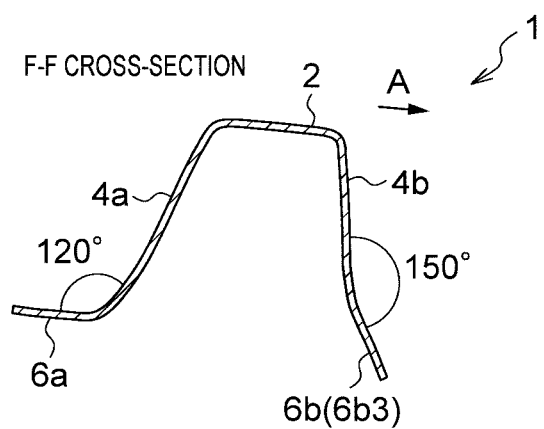
FIG. 2F is a cross-section (F-F cross-section) of a roof member, sectioned along line F-F in FIG. 2A.
Figure 3A:
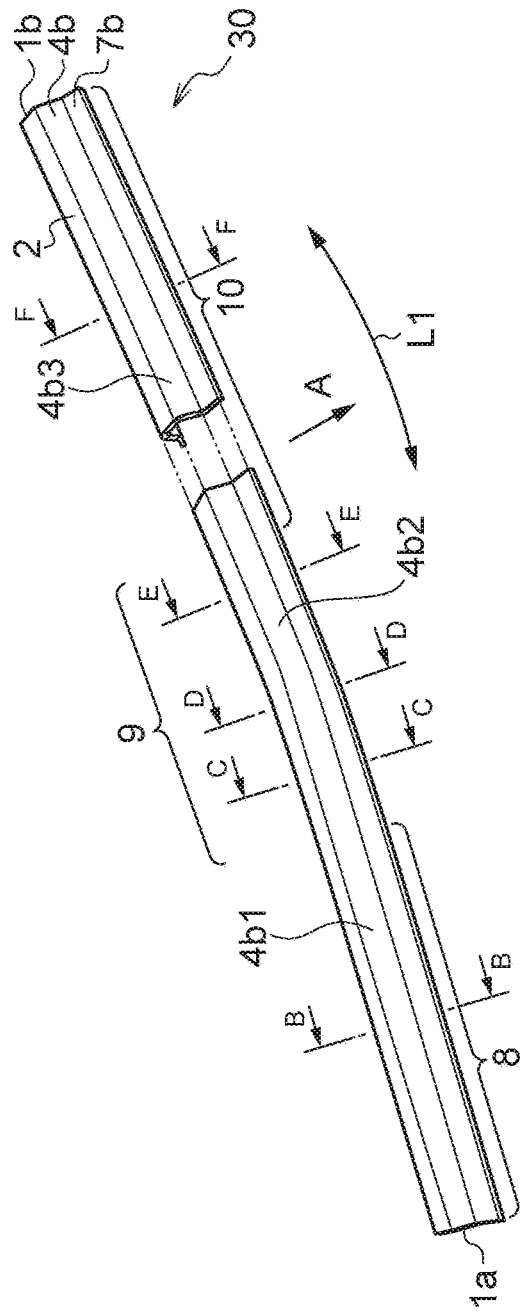
FIG. 3A is a perspective view and partial cross-section of an intermediate formed component of an exemplary embodiment.
Figure 3B:
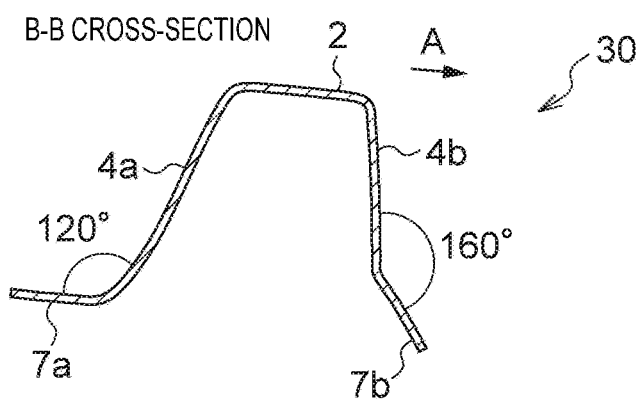
FIG. 3B is a cross-section (B-B cross-section) of an intermediate formed component, sectioned along line B-B in FIG. 3A.
Figure 3C:
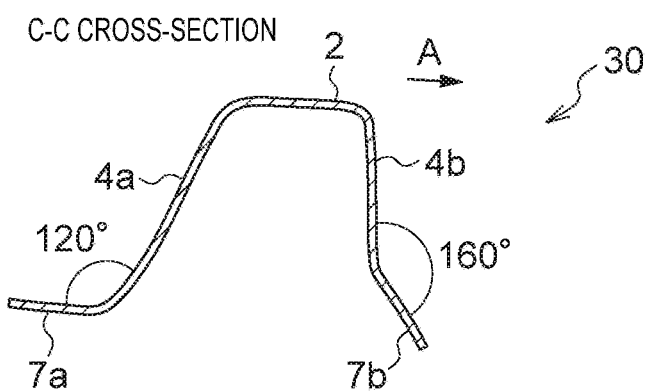
FIG. 3C is a cross-section (C-C cross-section) of an intermediate formed component, sectioned along line C-C in FIG. 3A.
Figure 3D:
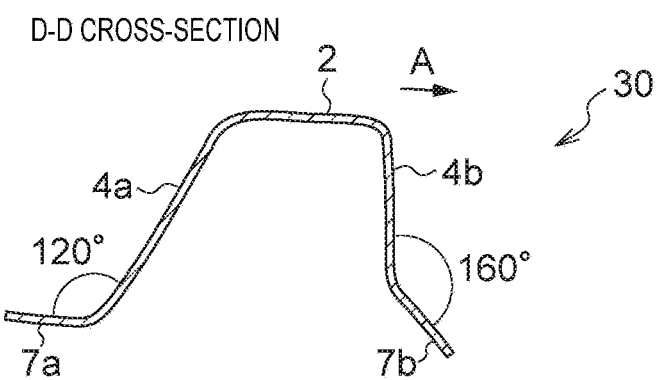
FIG. 3D is a cross-section (D-D cross-section) of an intermediate formed component, sectioned along line D-D in FIG. 3A.
Figure 3E:
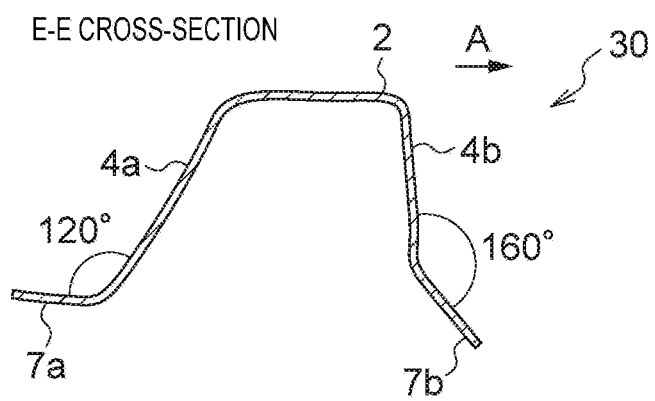
FIG. 3E is a cross-section (E-E cross-section) of an intermediate formed component, sectioned along line E-E in FIG. 3A.
Figure 3F:
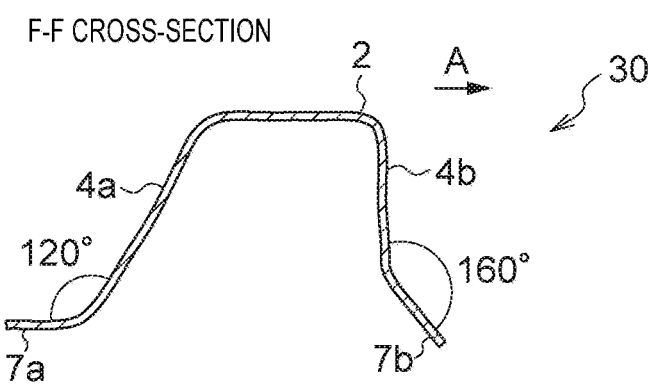
FIG. 3F is a cross-section (F-F cross-section) of an intermediate formed component, sectioned along line F-F in FIG. 3A.

As illustrated in FIG. 2B, the smaller angle out of the angles formed between the flange 6b and the portion 4b1 of the vertical wall 4b is, for example, set to 140°, namely to an obtuse angle. As illustrated in FIG. 2F, the smaller angle out of the angles formed between the flange 6b and the portion 4b3 of the vertical wall 4b is, for example, set to 150°, namely to an obtuse angle. On the other hand, the smaller angle out of the angles formed between the flange 6b and the portion 4b2 of the vertical wall 4b differs at respective portions in the length direction. More specifically, as illustrated in FIG. 2A, FIG. 2B, FIG. 2C, FIG. 2D, FIG. 2E, and FIG. 2F, the smaller angle out of respective angles formed between the flange 6b and the respective portions of the portion 4b2 along the length direction is set to 140° at a boundary with the portion 4b1, is set to 150° at a boundary with the portion 4b3, and progressively increases from 140° to 150° between the boundary with the portion 4b1, namely from one end in the length direction of the portion 4b1, to the boundary with the portion 4b3, namely the other end in the length direction of the portion 4b1. From another perspective, the smaller angle out of the respective angles formed between the flange 6b and the respective portions of the portion 4b2 along the length direction is set to 150° at the boundary with the portion 4b3 and to 140° at the boundary with the portion 4b1, and progressively decreases from 150° to 140° from the boundary with the portion 4b3, namely one end in the length direction of the portion 4b1 to the boundary with the portion 4b1, namely the other end in the length direction of the portion 4b1. From yet another perspective, the flange 6b connected to the portion 4b2 is twisted between one length direction end and the other length direction end. Note that the smaller angles out of the respective angles formed between the flange 6b and the respective portions of the portion 4b2 along the length direction are set to obtuse angles.

Figure 10:
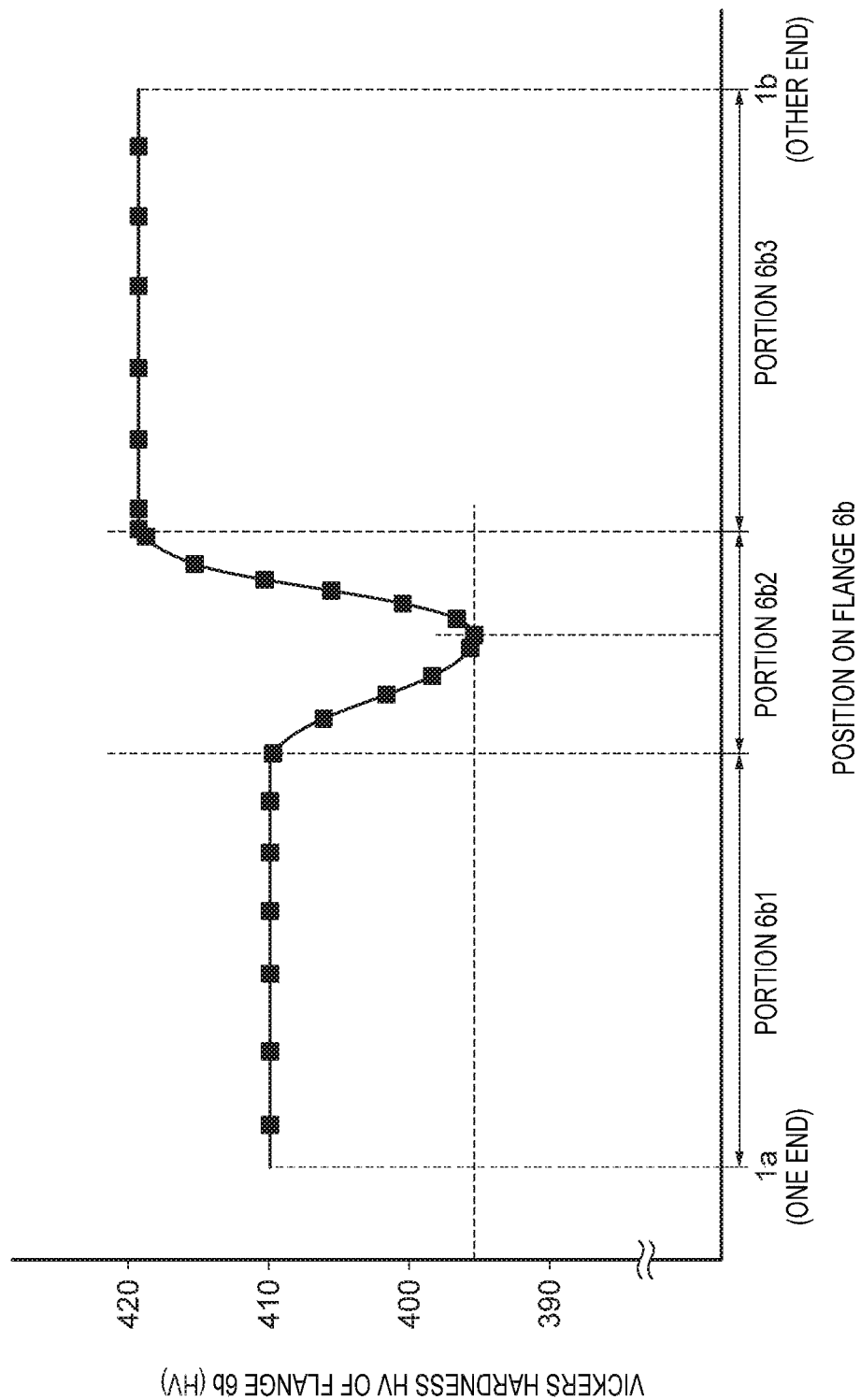
FIG. 10 is a graph illustrating a fitted curve of measured values for the Vickers hardness of a flange of a roof member of an exemplary embodiment, taken from one end to another end along a length direction.

The graph of FIG. 10 plots a fitted curve of measured values (measurement points indicated by black squares) for the Vickers hardness HV of the flange 6b of the roof member 1 of the present exemplary embodiment from one end 1a to the other end 1b along the length direction of the top plate 2. In the present exemplary embodiment, a portion of the flange 6b (referred to below as the portion 6b1) that is connected to the vertical wall 4b at the first portion 8, namely the portion 4b1 has, for example, a Vickers hardness HV value of 410 HV at a short direction end portion. A portion of the flange 6b (referred to below as the portion 6b3) that is connected to the vertical wall 4b at the third portion 10, namely the portion 4b3 has, for example, a Vickers hardness HV value of 420 HV at a short direction end portion. A portion of the flange 6b (referred to below as the portion 6b2) that is connected to the vertical wall 4b at the second portion 9, namely the portion 4b2, has a Vickers hardness HV value at a short direction end portion of 410 HV at the boundary with the portion 6b1 and of 420 HV at the boundary with the portion 6b3. In the length direction, from the boundary with the portion 6b1 to the boundary with the portion 6b3, there is a gradual decrease to a minimum value (for example 395 HV), followed by a gradual increase. Namely, the Vickers hardness HV value of an end portion of the portion 6b2 may be said to be lower than the highest Vickers hardness HV value out of the Vickers hardness HV values of an end portion of the portion 6b1 and an end portion of the portion 6b3. From another perspective, the end portion of the portion 6b2 may be said to include a portion having a lower Vickers hardness HV value than the lowest Vickers hardness HV values of the end portion of the portion 6b1 and the end portion of the portion 6b3. From yet another perspective, it could be said that the minimum value of the Vickers hardness HV value of the end portion of the portion 6b2 is lower than the Vickers hardness HV values of the end portion of the portion 6b1 and the end portion of the portion 6b3. Note that there is no limitation to the end portions, and as long as the hardness is measured at the same position in the short direction of the flange, the portion 6b2 similarly has a portion with a lower Vickers hardness HV value than the portions with the lowest Vickers hardness HV value in the portion 6b1 and the portion 6b3.

The foregoing explanation concerns configuration of the roof member 1 of the present exemplary embodiment.

Press Apparatus Configuration

Next, explanation follows regarding configuration of the press apparatus 17 of the present exemplary embodiment, with reference to the drawings. The press apparatus 17 of the present exemplary embodiment is used to manufacture the roof member 1 of the present exemplary embodiment. As illustrated in FIG. 4 to FIG. 7, the press apparatus 17 is configured including a first press device 18 and a second press device 19. As illustrated in FIG. 3A, FIG. 3B, FIG. 3C, FIG. 3D, FIG. 3E, FIG. 3F, FIG. 5, and FIG. 7, the press apparatus 17 of the present exemplary embodiment employs the first press device 18 to draw a blank BL so as to press the blank BL to form an intermediate formed component 30, and then uses the second press device 19 to press the intermediate formed component 30 to manufacture a manufactured component, namely the roof member 1. Note that the blank BL is configured by an elongated high tensile sheet steel as a base material for manufacturing the roof member 1.

Note that as illustrated in FIG. 3A, FIG. 3B, FIG. 3C, FIG. 3D, FIG. 3E, and FIG. 3F, the intermediate formed component 30 is a substantially hat-shaped member configured including the top plate 2, the two vertical walls 4a, 4b, and two preliminary flanges 7a, 7b. Moreover, in the present specification, "pressing" refers to a process spanning, for example, setting a forming target such as the blank BL or the intermediate formed component 30 in a mold such as a first mold 20 or a second mold 40, described later, closing the mold, and then opening the mold. Note that "pressing" refers to forming by pressing or applying pressing pressure to the forming target.

First Press Device

The first press device 18 has a function of pressing the blank BL, this being the forming target, to form the intermediate formed component 30.

Figure 4:
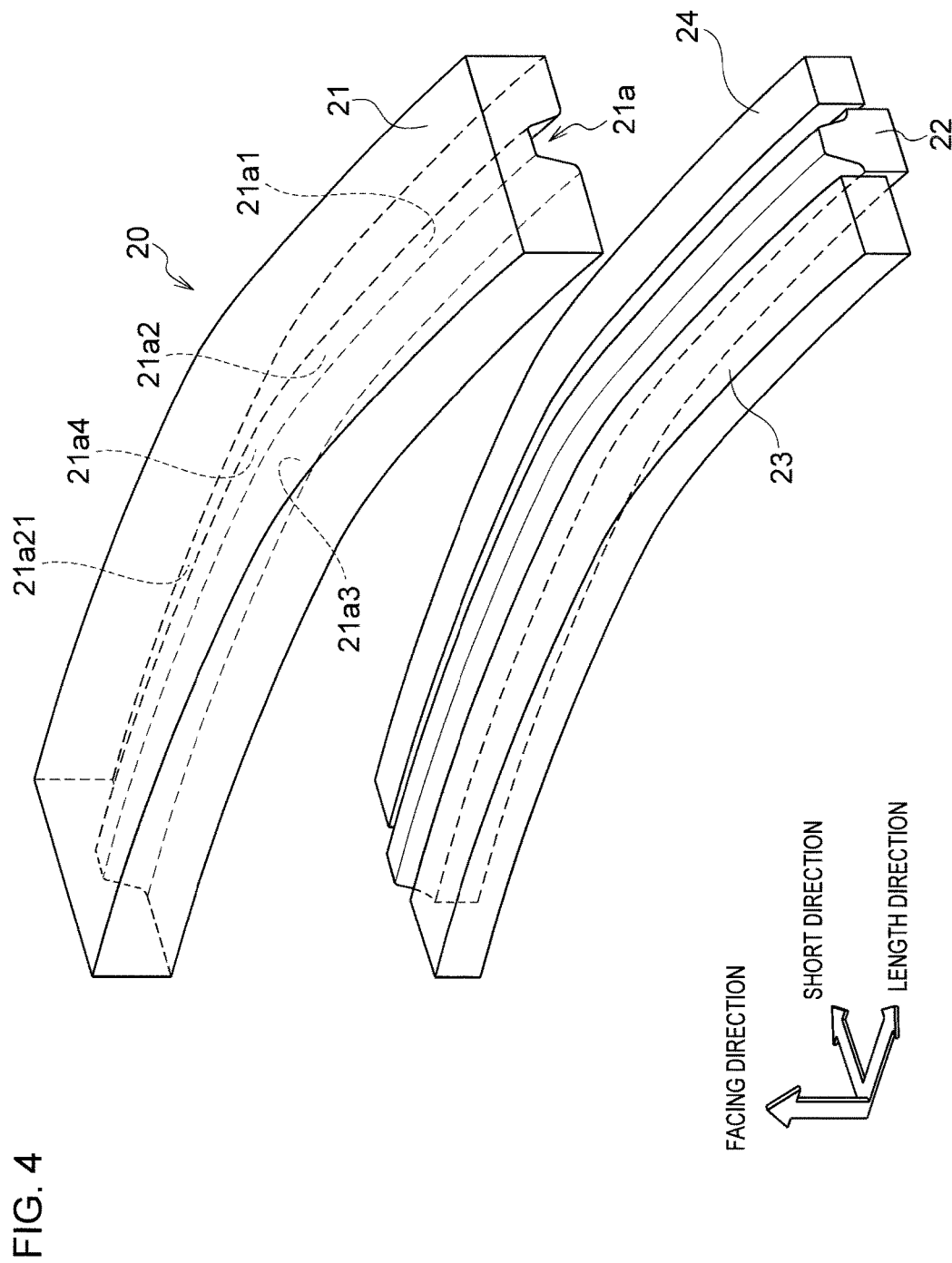
FIG. 4 is a perspective view illustrating a mold of a first press device employed in a first process of a roof member manufacturing method of an exemplary embodiment.
Figure 5:
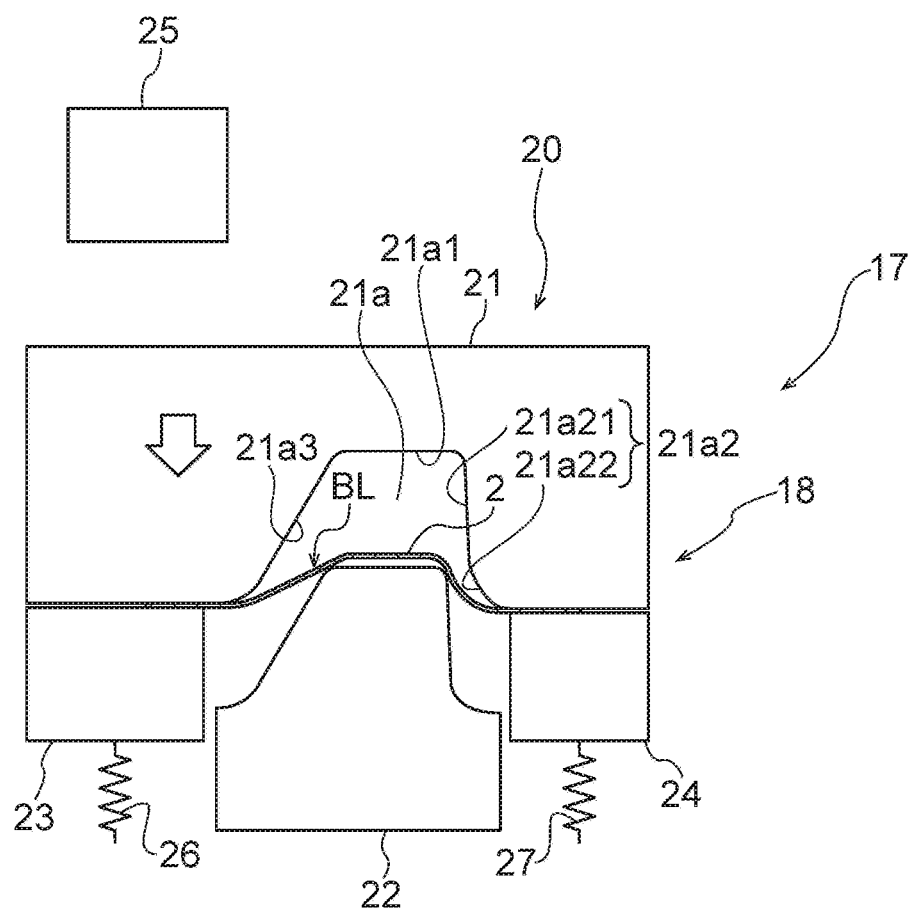
FIG. 5 is a vertical cross-section of a first press device employed in a first process of a roof member manufacturing method of an exemplary embodiment.

As illustrated in FIG. 5, the first press device 18 is configured including the first mold 20 and a first moving device 25. As illustrated in FIG. 4, the first mold 20 includes an upper mold 21, a lower mold 22, a first holder 23, and a second holder 24. The upper mold 21 is disposed at an upper side, and the lower mold 22 is disposed at a lower side. Note that the upper mold 21 is an example of a first die, and the lower mold 22 is an example of a first punch.

As illustrated in FIG. 4, the upper mold 21 and the lower mold 22 are both elongated. When the upper mold 21 and the lower mold 22 are viewed along the direction in which the upper mold 21 and the lower mold 22 face each other (the direction in which the upper mold 21 and the lower mold 22 face each other is also sometimes referred to below as the up-down direction in the present specification), the lower mold 22 projects out in a curve along its length direction, and as illustrated in FIG. 4 and FIG. 5, the upper mold 21 is formed with an elongated groove 21a that curves following the lower mold 22. Note that as illustrated in FIG. 4 and FIG. 5, the elongated groove 21a of the upper mold 21 is formed by faces including an elongated groove-bottom face 21a1, a curved face 21a2 connected to one short direction end of the groove-bottom face 21a1, and a curved face 21a3 connected to the other short direction end of the groove-bottom face 21a1. Note that the groove-bottom face 21a1 is an example of a first groove-bottom face, and the curved face 21a2 is an example of a first side face. Moreover, the curved face 21a2 is configured including a first curved face 21a21 connected to one short direction end of the groove-bottom face 21a1, and an inclined face 21a22 inclined with respect to the first curved face 21a21. As viewed along the up-down direction, namely as viewed along a mold closing direction, the inclined face 21a22 is connected to the opposite side of the first curved face 21a21 to the groove-bottom face 21a1 side, and is formed toward the opposite side to the groove-bottom face 21a1 side. The inclined face 21a22 is, for example, inclined at 160° with respect to the vertical wall 4b. Note that the inclined face 21a22 is an example of a first inclined face. Moreover, as illustrated in FIG. 4, when the upper mold 21 is viewed along the up-down direction, the curved face 21a2 is curved with a concave shape in its short direction, and the curved face 21a3 is curved with a convex shape in its short direction. Note that a sharp curve portion 21a4 that has a smaller radius of curvature than at both length direction end sides is formed at the length direction center of the first curved face 21a21. The sharp curve portion 21a4 is an example of a first sharp curve portion. Note that the radius of curvature R of the sharp curve portion 21a4 is, for example, set to from 500 mm to 2000 mm.

When the upper mold 21 is viewed along the length direction of the upper mold 21, the width of the groove 21a becomes progressively wider on progression from the groove bottom of the groove 21a, namely from the groove-bottom face 21a1, toward the opening side of the groove 21a, that is to say, on progression from the upper side toward the lower side. When the lower mold 22 is viewed along the length direction of the lower mold 22, the width of the projecting portion becomes progressively narrower on progression from the lower side toward the upper side.

As illustrated in FIG. 4, the first holder 23 and the second holder 24 are elongated, and are disposed at both short direction sides of the lower mold 22. Moreover, the first holder 23 and the second holder 24 are respectively biased toward the upper side by springs 26, 27.

The first moving device 25 is configured to move the upper mold 21 toward the lower mold 22. Namely, the first moving device 25 moves the upper mold 21 relative to the lower mold 22.

Moreover, in a state in which the blank BL has been disposed at a predetermined position in a gap between the upper mold 21 and the lower mold 22, the first moving device 25 moves the upper mold 21 toward the lower mold 22, as illustrated in FIG. 5, and the blank BL is pressed to form the intermediate formed component 30 in a state in which the two short direction end sides of the blank BL are respectively interposed between the first holder 23 and the upper mold 21, and the second holder 24 and the upper mold 21.

Explanation has been given above regarding the first press device 18. However, from another perspective, the first press device 18 can be described in the following manner. Namely, the upper mold 21 is formed with an elongated groove 21a configured including the elongated groove-bottom face 21a1 and the curved face 21a2 of which one end is connected to a short direction end portion of the groove-bottom face 21a1. Moreover, the curved face 21a2 is configured including the first curved face 21a21 that, as viewed along the mold closing direction, is curved in a concave shape opening toward the opposite side to the groove-bottom face 21a1 side and that includes the sharp curve portion 21a4 having a smaller radius of curvature R than at both sides of the sharp curve portion 21a4 in the length direction of the groove-bottom face 21a1. The curved face 21a2 is also configured including the inclined face 21a22 that is connected to the other end of the first curved face 21a21, that, as viewed along the mold closing direction, is formed on the opposite side to the groove-bottom face 21a1 side, and that is inclined with respect to the first curved face 21a21. Moreover, the shape of the lower mold 22 is a shape that fits together with the shape of the first groove during mold closure.

Second Press Device

The second press device 19 has a function of pressing the intermediate formed component 30, this being a forming target, to form the intermediate formed component 30 into a roof member.

Figure 7:
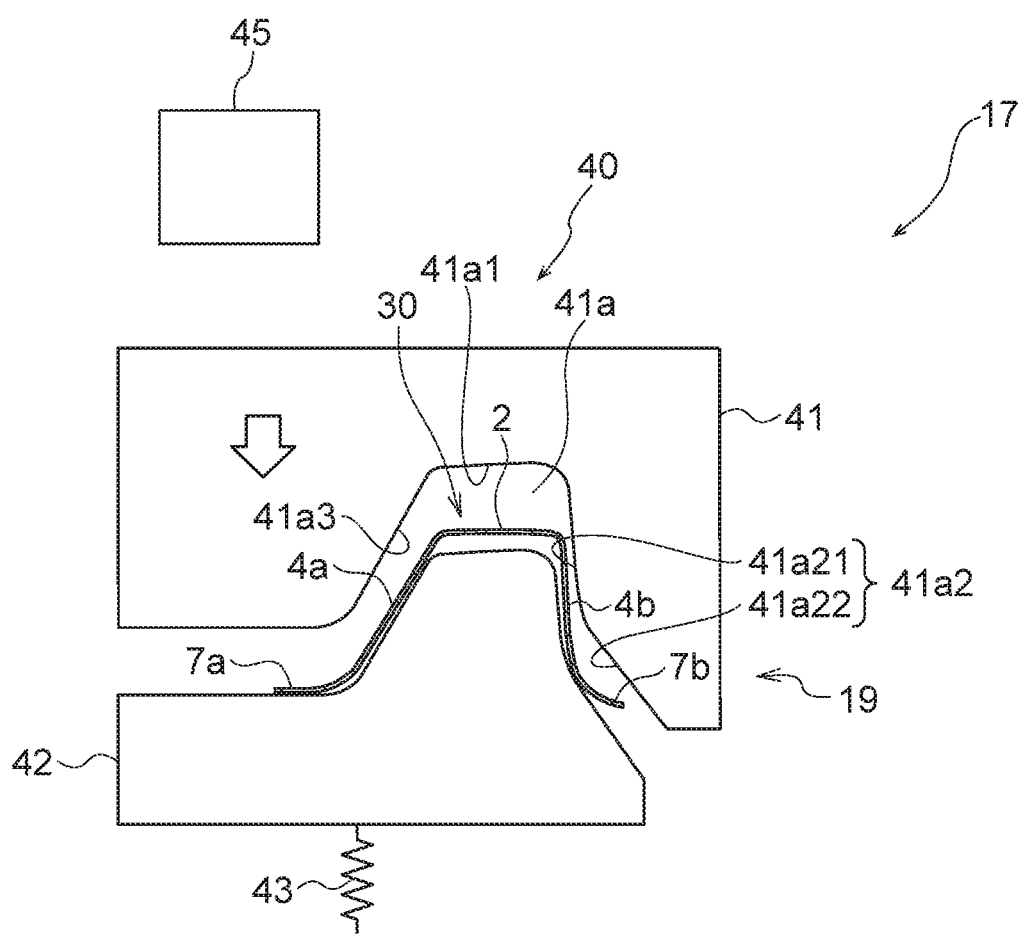
FIG. 7 is a vertical cross-section of a second press device employed in a second process of a roof member manufacturing method of an exemplary embodiment.

As illustrated in FIG. 7, the second press device 12 is configured including the second mold 40 and a second moving device 45. As illustrated in FIG. 7, the second mold 40 includes an upper mold 41 and a lower mold 42. Note that the upper mold 41 is an example of a second die, and the lower mold 42 is an example of a second punch. The upper mold 41 is disposed at the upper side, and the lower mold 42 is disposed at the lower side. The lower mold 42 is biased from the lower side by a spring 43. Moreover, in the second press device 19, in a state in which the intermediate formed component 30 has been fitted onto the lower mold 42, the upper mold 41 is moved toward the lower mold 42 side by the second moving device 45 so as to change the angle of the preliminary flange 7b of the intermediate formed component 30.

Figure 6:
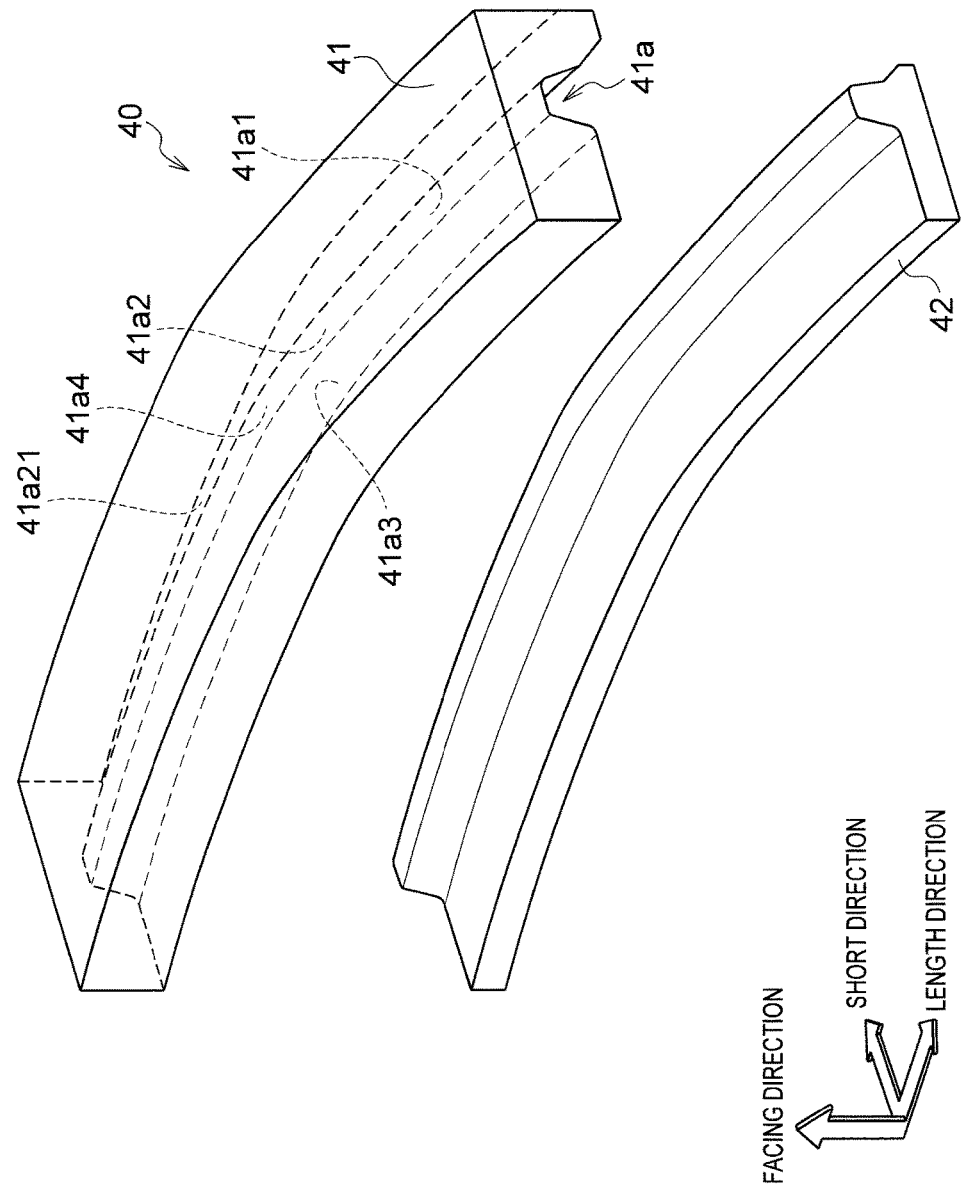
FIG. 6 is a perspective view illustrating a mold of a second press device employed in a second process of a roof member manufacturing method of an exemplary embodiment.

As illustrated in FIG. 6, the upper mold 41 and the lower mold 42 are both elongated. When the upper mold 41 and the lower mold 42 are viewed along the direction in which the upper mold 41 and the lower mold 42 face each other (the direction in which the upper mold 41 and the lower mold 42 face each other is also sometimes referred to below as the up-down direction in the present specification), as illustrated in FIG. 6 and FIG. 7, the lower mold 42 projects out in a curve along its length direction, and the upper mold 41 is formed with an elongated groove 41a that curves following the lower mold 42. Note that as illustrated in FIG. 6 and FIG. 7, the elongated groove 41a of the upper mold 41 is formed by faces including an elongated groove-bottom face 41a1, a curved face 41a2 connected to one short direction end of the elongated groove-bottom face 41a1, and a curved face 41a3 connected to the other short direction end of the elongated groove-bottom face 41a1. Note that the elongated groove-bottom face 41a1 is an example of a second groove-bottom face, and the curved face 41a2 is an example of a second side face. Moreover, the curved face 41a2 is configured including a second curved face 41a21 that is connected to one short direction end of the groove-bottom face 41a1, and an inclined face 41a22 that is inclined with respect to the second curved face 41a21. As viewed along the up-down direction, namely, as viewed along a mold closing direction, the inclined face 41a22 is connected to the opposite side of the second curved face 41a21 to the groove-bottom face 41a1 side, and is formed on the opposite side to the groove-bottom face 41a1 side. Note that the inclined face 41a22 is an example of a second inclined face.

Moreover, as illustrated in FIG. 6, when the upper mold 41 is viewed along the up-down direction, the curved face 41a2 is curved in a concave shape along its short direction, and the curved face 41a3 is curved in a convex shape along its short direction. Note that a sharp curve portion 41a4 having a smaller radius of curvature than at both length direction end sides is formed at the length direction center of the second curved face 41a21. Note that the sharp curve portion 41a4 is an example of a second sharp curve portion. The radius of curvature R of the sharp curve portion 41a4 is, for example, set to from 500 mm to 2000 mm.

Note that the angle formed between the inclined face 41a22 and the vertical wall 4b differs at each portion along the length direction of the upper mold 41. Specifically, along the length direction, the angles of respective portions of the part of the inclined face 41a22 connected to the sharp curve portion 41a4 are set at an angle of 150° at one end and an angle of 140° at the other end, and progressively decrease from 150° to 140° from the one end to the other end. From another perspective, along the length direction, the angles of the respective portions of the part of the inclined face 41a22 connected to the sharp curve portion 41a4 are set to an angle of 140° at one end and to an angle of 150° at the other end, and progressively increase from 140° to 150° from the one end to the other end. Moreover, the angle of the respective portions of the inclined face 41a22 on one end side of the sharp curve portion 41a4 in the length direction is set to 150°, and the angle of the respective portions of the inclined face 41a22 on the other end side of the sharp curve portion 41a4 in the length direction is set to 140°.

Moreover, when the upper mold 41 is viewed along the length direction of the upper mold 41, the width of the groove 41a becomes progressively wider from the groove bottom of the groove 41a, namely, from the groove-bottom face 41a1, toward the open side of the groove 41a, that is to say, on progression from the upper side toward the lower side. When the lower mold 42 is viewed along the length direction of the lower mold 42, the width of the projecting portion becomes progressively narrower on progression from the lower side toward the upper side.

Moreover, in a state in which the intermediate formed component 30 has been placed on the lower mold 42, the second moving device moves the upper mold 41 toward the lower mold 42, and the intermediate formed component 30 is pressed so as to form the roof member 1.

Explanation has been given above regarding configuration of the second press device 19. However, from another perspective, the second press device 12 can be described in the following manner. Namely, the upper mold 41 is formed with the elongated groove 41a configured including the elongated groove-bottom face 21a1 and the curved face 41a2 of which one end is connected to a short direction end portion of the groove-bottom face 41a1. The curved face 41a2 is configured including the curved face 41a2 that, as viewed along the mold closing direction, is curved in a convex shape bowing toward the opposite side to the groove-bottom face 41a1 side, and that includes the sharp curve portion 41a4 having a smaller radius of curvature R than at both sides of the sharp curve portion 41a4 in the length direction of the groove-bottom face 41a1. The curved face 41a2 is also configured including the inclined face 41a22 that is connected to the other end of the curved face 41a2, that, as viewed along the mold closing direction, is formed on the opposite side to the groove-bottom face 41a1 side, with the angle of a corner formed with respect to the sharp curve portion 41a4 differing at respective portions along the length direction. Moreover, the shape of the lower mold 42 is a shape that fits together with the shape of the groove 41a during mold closure.

The foregoing explanation concerns the configuration of the press apparatus 17 of the present exemplary embodiment.

Roof Member Manufacturing Method

Next, explanation follows regarding a manufacturing method of the roof member 1 of the present exemplary embodiment, with reference to the drawings. The manufacturing method of the roof member 1 of the present exemplary embodiment is performed employing the press apparatus 17. Moreover, the manufacturing method of the roof member 1 of the present exemplary embodiment includes a first process, this being a process performed using the first press device 18, and a second process, this being a process performed using the second press device 19.

First Process

As illustrated in FIG. 5, in the first process, the blank BL is disposed at a predetermined position in the gap between the upper mold 21 and the lower mold 22. Next, an operator operates the first press device 18 such that the upper mold 21 is moved toward the lower mold 22 side by the first moving device, and the blank BL is drawn so as to press the blank BL. Namely, in the first process, the upper mold 21 and the lower mold 22 are employed to press the blank BL, this being a forming target. The intermediate formed component 30 is formed from the blank BL as a result. Note that as illustrated in FIG. 3A, FIG. 3B, FIG. 3C, FIG. 3D, FIG. 3E, and FIG. 3F, the preliminary flange 7a is formed such that the smaller angle out of the angles formed between the flange 7a of the intermediate formed component 30 and the vertical wall 4a is 120° over the entire length direction range. Moreover, as illustrated in FIG. 3A, FIG. 3B, FIG. 3C, FIG. 3D, FIG. 3E, and FIG. 3F, the preliminary flange 7b is formed such that the smaller angle out of the angles formed between the preliminary flange 7b of the intermediate formed component 30 and the vertical wall 4b is 160° over the entire length direction range, namely such that the angle between the preliminary flange 7b and the vertical wall 4b is an obtuse angle.

Second Process

Next, as illustrated in FIG. 7, the intermediate formed component 30 is fitted onto the lower mold 42 of the second mold 40 of the second press device 19. The operator then operates the second press device 19 such that the upper mold 41 is moved toward the lower mold 42 side by the second moving device 19, thereby pressing the intermediate formed component 30. The roof member 1 is formed from the intermediate formed component 30 as a result. Note that in the second process, when the intermediate formed component 30 is pressed by the upper mold 41 and the lower mold 42, the angle between the preliminary flange 7a and the vertical wall 4a does not change. On the other hand, the angle of the portion of the preliminary flange 7b connected to the portion 4b1 of the vertical wall 4b is changed to 140°, and the angle of the portion of the preliminary flange 7b connected to the portion 4b3 of the vertical wall 4b is changed to 150°. Of the angles of the portion connected to the portion 4b2 of the vertical wall 4b (an example of a specific portion), the angle at the boundary with the portion 4b3 is changed to 150°, and the angle at the boundary with the portion 4b1 is changed to 140°, such that the angle progressively decreases along the length direction from the boundary with the portion 4b3 to the boundary with the portion 4b1. Moreover, when the preliminary flange 7b is deformed as described above in the second process, the preliminary flange 7b becomes the flange 6b. Accompanying this process, the length of a leading end side of the portion of the flange 6b connected to the portion 4b2 of the vertical wall 4b becomes longer than the length of a leading end side of the portion of the preliminary flange 7b connected to the portion 4b2 of the vertical wall 4b.

The foregoing explanation concerns the manufacturing method of the roof member 1 of the present exemplary embodiment.

Advantageous Effects

Next, explanation follows regarding advantageous effects of the present exemplary embodiment, drawing comparison to a comparative embodiment of the present exemplary embodiment, described later. Note that the roof member 1 of the comparative embodiment, which is not illustrated in the drawings, corresponds to Comparative Example 1 in FIG. 9, described later.

In the comparative embodiment, in the second process, the angle of the preliminary flange 7b with respect to the vertical wall 4b is changed to 150° from one end to the other end along the length direction. Namely, in the comparative embodiment, the angle of a sharp curve portion of the preliminary flange 7b, namely of the respective portions of the portion of the preliminary flange 7b connected to the portion 4b2, is the same from the one end to the other end along the length direction.

Moreover, according to evaluation results for Comparative Example 1 configured by the comparative embodiment, as illustrated in the table in FIG. 9, leading end portion twisting was 21.64°, rear end portion twisting was 17.63°, leading end portion bending was 6.66 mm, rear end portion bending was 9.78 mm, and the average bend amount was 8.22 mm.

Note that in the evaluation of leading end portion twisting and rear end portion twisting, a computer, not illustrated in the drawings, was employed to compare data SD for a roof member produced using a simulation based on the manufacture of a roof member of the comparative embodiment against design data DD. Specifically, the cross-sections of length direction central portions of the top plate 2 were aligned, namely, a best fit was found, and the angle of the top plate 2 in its short direction at a leading end portion and a rear end portion in the design data DD were set as references, with twisting being evaluated by the amount by which the angles of the top plate 2 at the leading end portion and the rear end portion in the measured data SD varied from these references, namely, X(°) in FIG. 8. Moreover, bending was taken to be the amount of width direction displacement of center positions O2 of a leading end portion and rear end portion in the measured data SD from center positions O1 of the leading end portion and rear end portion in the design data DD, namely, Y in FIG. 8. The average value of the leading end portion bending value and the rear end portion bending value was taken as the average bend amount.

By contrast, according to the evaluation results of Example 1 configured by the present exemplary embodiment, as illustrated the table of in FIG. 9, for a roof member 1 produced using a simulation based on the manufacture of a roof member of the present exemplary embodiment, leading end portion twisting was 16.64°, rear end portion twisting was 14.38°, leading end portion bending was 9.55 mm, rear end portion bending was 3.28 mm, and the average bend amount was 6.42 mm. Namely, in the evaluation results for the present exemplary embodiment, the values for all evaluation categories were lower than the values for all evaluation categories in the evaluation results for the comparative embodiment. In other words, the present exemplary embodiment may be said to suppress the occurrence of twisting better than the comparative embodiment. Moreover, the present exemplary embodiment may be said to suppress the occurrence of bending better than the comparative embodiment.

The reason that the present exemplary embodiment suppresses the occurrence of twisting and the occurrence of bending better than the comparative embodiment is speculated to be as follows. Namely, in the comparative embodiment, as described above, the angle of the respective portions of the portion of the preliminary flange 7b connected to the portion 4b2 is changed to the same angle from the one end to the other end along the length direction. On the other hand, in the present exemplary embodiment, in the second process, the angle of the portion of the preliminary flange 7b connected to the portion 4b2 of the vertical wall 4b is changed so as to progressively decrease along the length direction from the boundary with the portion 4b3 to the boundary with the portion 4b1, thereby configuring the flange 6b. Accompanying this process, the length of the leading end side of the portion of the flange 6b connected to the portion 4b2 becomes longer than the length of the leading end side of the portion of the preliminary flange 7b connected to the portion 4b2. Moreover, in the present exemplary embodiment, the length of a leading end side of the portion of the preliminary flange 7b connected to the portion 4b2 that becomes longer due to deformation of the flange 6b is greater than in the comparative embodiment. As a result, in the roof member 1 of the present exemplary embodiment, compressive stress at the portion of the flange 6b connected to the portion 4b2, namely the portion of the flange 6b subject to the greatest compressive stress out of length direction portions of the flange 6b, is decreased in comparison to in the roof member of the comparative embodiment. Note that in the present specification, "compressive stress" refers to residual stress in the material when at the pressing bottom dead center.

Accordingly, according to the present exemplary embodiment, in the second process, the occurrence of bending as viewed from the top plate 2 side is better suppressed than in cases in which the angle of the sharp curve portion of the preliminary flange 7b, namely of respective portions of the portion of the preliminary flange 7b connected to the portion 4b2, is changed to the same angle from the one end to the other end along the length direction. Moreover, according to the present exemplary embodiment, in the second process, the occurrence of twisting as viewed along the length direction is better suppressed than in cases in which the angle of the sharp curve portion of the preliminary flange 7b, namely of the respective portions of the portion of the preliminary flange 7b connected to the portion 4b2, is changed to the same angle from the one end to the other end along the length direction.

The foregoing explanation concerns the advantageous effects of the present exemplary embodiment.

EXAMPLES

Next, explanation follows regarding Examples and Comparative Examples, with reference to the drawings. Note that in the following explanation, when the reference signs used for components and the like are similar to the reference signs used for components and the like in the present exemplary embodiment and the comparative embodiment, the reference signs for these components are being carried over as-is.

Explanation regarding the table of FIG. 9

The table of FIG. 9 lists simulation parameters and evaluation results for Examples 1 to 12 and Comparative Examples 1 to 5. Note that in the table of FIG. 9, "plate thickness" is the thickness of the blank BL employed in the simulation. "Strength" is the tensile strength of the blank BL employed in the simulation. Under the first process, entries are listed for the portion 4b1, the portion 4b2, and the portion 4b3. The angle (°) between the preliminary flange 7b where connected to the portion 4b1 and the vertical wall 4b, the angle (°) between the preliminary flange 7b where connected to the portion 4b2 and the vertical wall 4b, and the angle (°) between the preliminary flange 7b where connected to the portion 4b3 and the vertical wall 4b are listed separately. Likewise, under the second process, entries are listed for the portion 4b1, the portion 4b2, and the portion 4b3. The angle (°) between the preliminary flange 7b where connected to the portion 4b1 and the vertical wall 4b, the angle) (°) between the preliminary flange 7b where connected to the portion 4b2 and the vertical wall 4b, and the angle (°) between the preliminary flange 7b where connected to the portion 4b3 and the vertical wall 4b are listed separately. Note that in the case of Example 2, the entries under the first process give "160 to 165" as the angle (°) between the preliminary flange 7b where connected to the portion 4b2 and the vertical wall 4b. This is in reference to the fact that the angle varies progressively from 160° to 165° from the boundary of the portion 4b2 with the portion 4b1 to the boundary of the portion 4b2 with the portion 4b3. Moreover, in the cases of Examples 2 to 7, the entries under the second process give "140 to 150" as the angle (°) between the flange 6b where connected to the portion 4b2 and the vertical wall 4b. This is in reference to the fact that the angle varies progressively from 140° to 150° from the boundary of the portion 4b2 with the portion 4b1 to the boundary of the portion 4b2 with the portion 4b3. Moreover, in the cases of Examples 8, 10, and 11, the entries under the second process give "100 to 90" as the angle (°) between the flange 6b where connected to the portion 4b2 and the vertical wall 4b. This is in reference to the fact that the angle varies progressively from 100° to 90° from the boundary of the portion 4b2 with the portion 4b1 to the boundary of the portion 4b2 with the portion 4b3. In the cases of Examples 9 and 12, although the angle ranges given under the second process are different to those given in the cases of Examples 8, 10, and 11, this is similarly in reference to the fact that the angle varies progressively from 130° to 110° from the boundary of the portion 4b2 with the portion 4b1 to the boundary of the portion 4b2 with the portion 4b3. The leading end portion twisting, rear end portion twisting, leading end portion bending, rear end portion bending, and average bend amount are as described above.

Evaluation Results and Interpretation

In the table in FIG. 9, the roof members 1 of Examples 1 to 12 have a smaller average bend amount than the roof members of Comparative Examples 1 to 4 under the same plate thickness and strength parameters. In other words, it is apparent that less bending occurs. Moreover, it can be seen that the roof members 1 of Examples 1 to 12 undergo less twisting than the roof members of Comparative Examples 1 to 4 under the same plate thickness and strength parameters. It may therefore be considered that Examples 2 to 12, these being examples of Example 1 configured by the present exemplary embodiment, exhibit the advantageous effects of the present exemplary embodiment described above to a greater extent than Comparative Examples 2 to 4, these being examples of Comparative Example 1 configured by the comparative embodiment.

The present disclosure has been explained above using the present exemplary embodiment and the Examples 2 to 12, these being examples of the present exemplary embodiment. However, other modes than those of the present exemplary embodiment and the Examples 2 to 12 described above are also included within the technical scope of the present disclosure. For example, the following modes are also included within the technical scope of the present disclosure.

In the present exemplary embodiment and the Examples, explanation has been given using the roof member as an example of the pressed component. However, the pressed component may be an automotive component other than a roof member as long as it is manufactured by a method including the first process and the second process of the present exemplary embodiment. Moreover, the pressed component may also be a component other than an automotive component as long as it is manufactured by a method including the first process and the second process of the present exemplary embodiment.

In the present exemplary embodiment and the Examples, explanation has been given in which drawing is performed in the first process and the second process. However, there is no limitation to drawing as long as the preliminary flange 7b is formed in the first process, and in the second process, the angle of the portion of the preliminary flange 7b connected to the portion 4b2 of the vertical wall 4b is changed so as to vary progressively along the length direction from the boundary with the portion 4b3 to the boundary with the portion 4b1. For example, bending may be performed.

Explanation has been given in which the pressed components of the present exemplary embodiment and the Examples are configured including a top plate, two vertical walls, and two flanges. However, the presence or absence of other configuration elements is does not matter as long as the pressed component is configured including: an elongated top plate; a wall (vertical wall) having one end connected to a short direction end portion of the top plate, that curves with a convex shape bowing toward the opposite side to the top plate as viewed from the upper side of the top plate, and that includes a sharp curve portion having a smaller radius of curvature than at both sides of the sharp curve portion in the top plate length direction; and a flange that is connected to another end of the wall and that extends in a plate thickness direction of the wall toward the opposite side to the top plate side, with an angle of a corner formed between the flange and the sharp curve portion progressively increasing or decreasing at respective portions from one end to the other end of the flange in the length direction. For example, a pressed component included within the technical scope of the present disclosure need not include a vertical wall opposing the wall (vertical wall) that has the sharp curve portion. Moreover, in pressed components included within the technical scope of the present disclosure, a flange need not be connected to a vertical wall opposing the sharp curve portion.

Explanation has been given in which the pressed components of the present exemplary embodiment and the Examples are configured including a top plate, two vertical walls, and two flanges, and the two vertical walls are curved along the length direction as viewed from the upper side of the top plate. However, the shape of the vertical wall opposing the sharp curve portion is not limited to the shapes of the present exemplary embodiment and the Examples as long as the pressed component is configured including: an elongated top plate; a wall, namely a vertical wall, having one end connected to a short direction end portion of the top plate, that curves with a convex shape bowing toward the opposite side to the top plate as viewed from an upper side of the top plate, and that includes a sharp curve portion having a smaller radius of curvature than at both sides of the sharp curve portion in the top plate length direction; and a flange that is connected to another end of the wall and that extends in a plate thickness direction of the wall toward the opposite side to the top plate side, with an angle of a corner formed between the flange and the sharp curve portion differing at respective portions along the length direction. For example, in pressed components included within the technical scope of the present disclosure, a vertical wall opposing the sharp curve portion may have a linear shape as viewed from the upper side of the top plate.

Supplement

The following additional disclosure is a generalization from the present specification.

Namely, the additional disclosure is

"A manufacturing method for a pressed component in which:

a blank configured by sheet steel having a tensile strength of from 440 MPa to 1600 MPa is subjected to a first pressing using a punch, a die, and a holder so as to manufacture an intermediate formed component that has a substantially hat-shaped lateral cross-section profile configured including a top plate present extending along a length direction, two ridge lines respectively connected to both sides of the top plate, two vertical walls respectively connected to the two ridge lines, two concave ridge line portions respectively connected to the two vertical walls, and two flanges respectively connected to the two concave ridge line portions, and that includes a curved portion curved from one end portion to another end portion in the length direction in both plan view and side view when disposed in an orientation in which the top plate is positioned at an upper portion; and the intermediate formed component is subjected to a second pressing employing a punch, a die, and a holder such that the respective radii of curvature of a first portion along the length direction including the one end portion and of a third portion along the length direction including the other end portion are larger than the radius of curvature of a second portion contiguous to both the first portion and the third portion, and at least one flange out of the two flanges forms an angle that changes along the length direction with respect to the vertical wall contiguous to the flange across the concave ridge line portion, wherein:

in the first pressing, the vertical wall and the flange on an outer side of the curved portion of the intermediate formed component are formed so as to satisfy Equation (1) below, and in the second pressing, the vertical wall and the flange on an outer side of the curved portion of the intermediate formed component are formed into the vertical wall and the flange on an outer side of the curved portion of the pressed component, and a length direction change amount of the angle of the flange on the outer side of the curved portion of the pressed component is greater than a length direction change amount of the angle of the flange on the outer side of the curved portion of the intermediate formed component so as to satisfy Equation (2) below.

$$0.9 \leq DOF1/DOR1 \leq 1 \quad \text{Equation (1)}$$

$$\Delta DO2 > \Delta DO1 \quad \text{Equation (2)}$$

wherein

DOF1 is an angle formed between the vertical wall and the flange on the outer side of the curved portion, including at the one end portion of the intermediate formed component, DOR1 is an angle formed between the vertical wall and the flange on the outer side of the curved portion, including at the other end portion of the intermediate formed component, $\Delta DO1$ is a length direction change amount of the angle of the flange on the outer side of the curved portion of the intermediate formed component, and $\Delta DO2$ is a length direction change amount of the angle of the flange on the outer side of the curved portion of the pressed component".

The disclosure of Japanese Patent Application No. 2015-087506, filed on Apr. 22, 2015, is incorporated in its entirety by reference herein. All cited documents, patent applications, and technical standards mentioned in the present specification are incorporated by reference in the present specification to the same extent as if the individual cited document, patent application, or technical standard was specifically and individually indicated to be incorporated by reference.

The invention claimed is:

1. A pressed component comprising:

an elongated top plate;

a wall having one end connected to a short direction end portion of the top plate, that curves with a convex shape bowing toward an opposite side to the top plate as viewed from an upper side of the top plate, and that includes a sharp curve portion having a smaller radius of curvature than at both sides of the sharp curve portion in the top plate length direction; and a flange that is connected to another end of the wall and that extends in a plate thickness direction of the wall toward the opposite side of the wall to the top plate side, with an angle of a corner formed between the flange and the wall at the sharp curve portion progressively increasing or decreasing from one end to the other end of the flange in the length direction.

2. The pressed component of claim 1, wherein a Vickers hardness value of a portion of the flange connected to the sharp curve portion is lower than a Vickers hardness value of a portion of the flange having a highest Vickers hardness value out of portions of the flange connected to the wall on one end side and on the other end side of the sharp curve portion in the length direction.

* * * * *